United States Patent
Kunberger

(10) Patent No.: US 10,655,785 B2
(45) Date of Patent: May 19, 2020

(54) MOTOR VEHICLE WITH A CRYOGENIC PRESSURE VESSEL AND METHOD FOR REFUELLING A CRYOGENIC PRESSURE VESSEL OF A MOTOR VEHICLE

(71) Applicant: Bayerische Motoren Werke Aktiengesellschaft, Munich (DE)

(72) Inventor: Jan-Mark Kunberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 15/496,165

(22) Filed: Apr. 25, 2017

(65) Prior Publication Data

US 2017/0225939 A1 Aug. 10, 2017

Related U.S. Application Data

(63) Continuation of application No. PCT/EP2015/078812, filed on Dec. 7, 2015.

(30) Foreign Application Priority Data

Dec. 19, 2014 (DE) .................. 10 2014 226 545

(51) Int. Cl.
*F17C 13/00* (2006.01)
*F17C 5/02* (2006.01)
(Continued)

(52) U.S. Cl.
CPC ............. *F17C 13/001* (2013.01); *B67D 7/04* (2013.01); *B67D 7/3218* (2013.01); *B67D 7/78* (2013.01);
(Continued)

(58) Field of Classification Search
CPC ...... F17C 1/12; F17C 3/02; F17C 3/08; F17C 13/001
See application file for complete search history.

(56) References Cited

U.S. PATENT DOCUMENTS 4,263,945 A * 4/1981 Van Ness ............... B67D 7/348
137/234.6
2012/0125482 A1 5/2012 Mori
(Continued)

FOREIGN PATENT DOCUMENTS

DE 10 2004 010 937 A1 9/2005
DE 10 2008 019 594 A1 10/2009
(Continued)

OTHER PUBLICATIONS

International Search Report (PCT/ISA/210) issued in PCT Application No. PCT/EP2015/078812 dated Apr. 5, 2016 with English translation (Four (4) pages).
(Continued)

*Primary Examiner* — Timothy P. Kelly
(74) *Attorney, Agent, or Firm* — Crowell & Moring LLP

(57) ABSTRACT

A method is provided for refueling a cryogenic pressure vessel of a motor vehicle. The motor vehicle has: a) a cryogenic pressure vessel having an internal vessel which stores a fluid, an external vessel and heat insulation which is arranged between the internal vessel and the external vessel, at least in certain areas; and b) a controller, wherein the controller is designed to interrupt refueling of the motor vehicle if, in the case of damaged thermal insulation, a lower fluid density limiting value for the fluid in the internal vessel is exceeded. The lower fluid density limiting value is lower than an upper fluid density limiting value for the fluid in the internal vessel in the case of refueling of the internal vessel with intact thermal insulation.

7 Claims, 2 Drawing Sheets

(51) Int. Cl.
  *B67D 7/04*   (2010.01)
  *B67D 7/32*   (2010.01)
  *B67D 7/78*   (2010.01)
  *F17C 1/00*   (2006.01)
  *F17C 1/12*   (2006.01)

(52) U.S. Cl.
  CPC ............... *F17C 1/005* (2013.01); *F17C 1/12* (2013.01); *F17C 5/02* (2013.01); *F17C 2201/0109* (2013.01); *F17C 2203/018* (2013.01); *F17C 2203/0391* (2013.01); *F17C 2203/0629* (2013.01); *F17C 2205/0192* (2013.01); *F17C 2205/0326* (2013.01); *F17C 2221/012* (2013.01); *F17C 2221/033* (2013.01); *F17C 2223/0161* (2013.01); *F17C 2223/036* (2013.01); *F17C 2250/032* (2013.01); *F17C 2250/034* (2013.01); *F17C 2250/043* (2013.01); *F17C 2250/0421* (2013.01); *F17C 2250/0439* (2013.01); *F17C 2250/0491* (2013.01); *F17C 2250/0636* (2013.01); *F17C 2250/072* (2013.01); *F17C 2260/035* (2013.01); *F17C 2260/042* (2013.01); *F17C 2265/065* (2013.01); *F17C 2270/0168* (2013.01)

(56) References Cited

U.S. PATENT DOCUMENTS

| | | |
|---|---|---|
| 2012/0205003 A1 | 8/2012 | Okawachi |
| 2012/0216910 A1 | 8/2012 | Inagi et al. |
| 2012/0227864 A1 | 9/2012 | Mori |
| 2012/0318378 A1 | 12/2012 | Yahashi et al. |
| 2013/0014854 A1 | 1/2013 | Mori |
| 2015/0028039 A1* | 1/2015 | Kircher ............ F17C 3/02 220/592.27 |

FOREIGN PATENT DOCUMENTS

| | | |
|---|---|---|
| DE | 11 2010 004 462 T5 | 8/2012 |
| DE | 11 2010 005 175 T5 | 10/2012 |
| DE | 11 2009 005 421 T5 | 12/2012 |
| DE | 11 2010 003 119 T5 | 3/2013 |
| DE | 11 2010 004 411 T5 | 4/2013 |
| DE | 10 2012 218 989 A1 | 6/2014 |
| DE | 11 2011 100 541 B4 | 6/2014 |
| EP | 1 205 704 A1 | 5/2005 |
| EP | 1 546 601 B1 | 8/2007 |
| WO | WO 2008/145584 A1 | 12/2008 |
| WO | WO 2011/061584 A1 | 5/2011 |

OTHER PUBLICATIONS

German-language Written Opinion (PCT/ISA/237) issued in PCT Application No. PCT/EP2015/078812 dated Apr. 5, 2016 (Seven (7) pages).

German-language Search Report issued in counterpart German Application No. 10 2014 226 545.2 dated Nov. 6, 2015 with partial English translation (Fifteen (15) pages).

Gas constant, Wikipedia, the free encyclopedia, URL: https://de.wikipedia.org/w/index.php?title=Gaskonstante&oldid=135596974 retrieved Apr. 18, 2017, with English translation (Eight (8) pages).

Ideal gas law, Wikipedia, the free encyclopedia, URL: https://de.wikipedia.org/w/index.php?title=Thermische_Zustandsgleichung_idealer_Gase&oldid=135596608 retrieved Apr. 18, 2017, With English translation (Fourteen (14) pages).

Cover page of EP 2 162 670 A0 published Mar. 17, 2010 (one (1) page).

* cited by examiner

MOTOR VEHICLE WITH A CRYOGENIC PRESSURE VESSEL AND METHOD FOR REFUELLING A CRYOGENIC PRESSURE VESSEL OF A MOTOR VEHICLE

CROSS REFERENCE TO RELATED APPLICATIONS

This application is a continuation of PCT International Application No. PCT/EP2015/078812, filed Dec. 7, 2015, which claims priority under 35 U.S.C. § 119 from German Patent Application No. 10 2014 226 545.2, filed Dec. 19, 2014, the entire disclosures of which are herein expressly incorporated by reference.

BACKGROUND AND SUMMARY OF THE INVENTION

The technology disclosed here relates to a motor vehicle with a cryogenic pressure vessel and to a method for refueling a cryogenic pressure vessel of a motor vehicle.

Cryogenic pressure vessels are known from the prior art. Such a pressure vessel has an inner vessel and an outer vessel which surrounds the latter with the formation of a super-insulated (for example evacuated) (intermediate) space. Cryogenic pressure vessels are used, for example, for motor vehicles in which a fuel which is gaseous under ambient environmental conditions is stored cryogenically and therefore in the liquid or supercritical state of aggregation, thus substantially at a significantly higher density in comparison to the environmental conditions. Such fuels, for example hydrogen or compressed natural gas, are stored in the cryogenic pressure vessels at, for example, temperatures of approx. 30 K to 360 K. The pressure vessels therefore require extremely good thermal insulation in order to prevent as far as possible the undesirable introduction of heat into the cryogenically stored medium. Highly effective insulation casings (for example vacuum casings) are therefore provided. For example, EP 1 546 601 B1 discloses such a pressure vessel. Furthermore, DE 10 2012 218 989 A1 and DE 11 2010 004 462 T5 are prior art.

If the thermal insulation of the pressure vessel is inadequate or if the thermal insulation is damaged, the stored fuel heats up slowly. At the same time, the pressure in the pressure vessel rises slowly. If a limit pressure is exceeded, the fuel has to escape via suitable safety devices in order to avoid bursting the cryogenic pressure vessel. For this purpose, use is made of, for example, what is referred to as a blow-off management system or boil-off management system (referred to as BMS below). These systems permit fuel to escape, wherein the released fuel is converted, for example, in a catalytic converter. Furthermore, use is additionally made of mechanical safety valves (SVT) or pressure control valves and bursting disks which, mounted downstream of the BMS, can discharge the fuel.

If a pressure vessel having the maximum storage density of an undamaged pressure vessel despite having defective thermal insulation is refueled, the abovementioned safety devices gradually become active. If the released fuel cannot be converted by the BMS, the fuel is released unused into the environment. An explosive or at least combustible mixture could then arise. Therefore, the use of the vehicle with defective thermal insulation should cease and the pressure vessel should be immediately replaced.

It is an object of the technology disclosed here to improve a cryogenic pressure vessel or to provide an alternative configuration. The object is achieved by a motor vehicle with a cryogenic pressure vessel in accordance with embodiments of the invention.

The technology disclosed here relates to a motor vehicle. The motor vehicle includes one or more cryogenic pressure vessels. The cryogenic pressure vessel is, for example, a cryogenic pressure vessel that has been described in the introductory part. In particular, it is suitable for storing fuel, preferably hydrogen, in the supercritical range, i.e. preferably in the design or operating temperature window of approx. 30 K to approx. 360 K, particularly preferably in the temperature window of approx. 40 K to approx. 330 K. The cryogenic pressure vessel preferably stores the fuel at the same time within a pressure range of approx. 5 bar to approx. 1000 bar, preferably within a pressure range of approx. 5 bar to approx. 700 bar, and particularly preferably of approx. 20 bar to approx. 350 bar. A cryogenic pressure vessel is suitable in particular for storing the fuel at temperatures which lie significantly below the operating temperature of the motor vehicle (i.e. the temperature range of the vehicle surroundings in which the vehicle is intended to be operated), for example at least 50 Kelvin (K), preferably at least 100 Kelvin (K) or at least 150 Kelvin (K) below the operating temperature of the motor vehicle (as a rule approx. −40° C. to approx. +85° C.).

The cryogenic pressure vessel includes, inter alia, an inner vessel storing a fluid and an outer vessel which surrounds the inner vessel. The inner vessel is held in the outer vessel in a manner as thermally insulated as possible. Thermal insulation V is arranged at least in regions between the inner vessel and the outer vessel. In addition to ideal or perfect insulation, the term "thermal insulation" also includes here thermal insulation at which a small heat exchange still takes place. The heat exchange can be of any type, for example heat conduction, heat radiation, heat convection, etc. The thermal insulation V can be designed, for example, as an evacuated space V.

Furthermore, at least one sensor for monitoring the thermal insulation V can be provided on the pressure vessel. The at least one sensor can be a pressure sensor which monitors the pressure in the evacuated space V. The sensor can also be a temperature sensor which monitors the temperature of the inner vessel, in the thermal insulation V, or of the outer vessel and, together with further parameters, such as, for example, the fluid density in the inner vessel and/or the inner vessel pressure, permits conclusions to be drawn regarding the thermal insulation V. However, other suitable monitoring sensors or monitoring devices can also be provided.

The motor vehicle furthermore includes one or more controllers. At least one controller is designed to interrupt refueling of the motor vehicle if, in the event of damaged thermal insulation V, a lower fluid density limit value $D_{UB}$ for the fluid in the inner vessel is exceeded.

The fluid density D in the inner vessel is the quotient of mass of fluid in the inner vessel divided by the inner vessel volume. The lower fluid density limit value $D_{UB}$ of the fluid in the inner vessel is a limit value which should be taken into consideration during the refueling of a pressure vessel with damaged thermal insulation. The lower fluid density limit value $D_{UB}$ indicates up to which fluid density the inner vessel may be maximally (and in particular cryogenically) refueled because of the damaged thermal insulation.

The lower fluid density limit value $D_{UB}$ can be selected in such a manner that, even when the vehicle/the pressure tank is operated (or else is stopped) at temperatures at the upper edge of the temperature window, for example at environmental temperatures, a vessel inner pressure which lies above the maximum operating pressure does not arise in the inner vessel after the refueling because of the thermal expansion of the fluid.

In an advantageous configuration, the lower fluid density limit value $D_{UB}$ varies with the amount of damage of the thermal insulation V. If, for example, there is little damage to the thermal insulation V, the controller interrupts the refueling of the motor vehicle at a higher lower fluid density limit value $D_{UB}$ than in the case in which there is greater damage to the thermal insulation V.

The lower fluid density limit value $D_{UB}$ is lower than an upper fluid density limit value $D_{OB}$. The upper fluid density limit value $D_{OB}$ is the limit value for the fluid in the inner vessel in the case of cryogenic refueling of the inner vessel having intact thermal insulation V. The upper fluid density limit value $D_{OB}$ can be, for example, the fluid density which arises if the inner pressure vessel is cryogenically refueled at a fluid temperature in the lower range of the temperature window or else below the latter (for example approx. 30 K to approx. 50 K) until the maximum operating pressure of the inner pressure vessel arises in the inner pressure vessel.

Intact thermal insulation V has thermal insulation which is original or functional for the normal operation. The intact thermal insulation V is designed here in such a manner that heat gradually penetrating the inner vessel allows the temperature and the internal pressure in the inner vessel to slowly rise. On account of the slow rise, the BMS has sufficient time to convert the fuel. Since the BMS can convert the fuel completely, the mechanical safety valves (SVT) and bursting disks do not release any fuel into the environment during this normal operation. The quantities of hydrogen which are converted via the BMS are comparatively low here. Even the internal pressure in the vessel does not rise above the maximum operating pressure of the inner vessel. In association therewith, the BMS is designed in such a manner that it can always satisfactorily convert fuel during the normal operation in order to avoid a rise in pressure, which is imminent due to penetrating heat, such that the maximum operating pressure is not exceeded. For this purpose, the BMS is provided with a certain margin of safety. In other words, the BMS can convert more fuel than would actually occur during normal operation with intact thermal insulation V. Even small degradations can therefore be absorbed.

However, defective or damaged thermal insulation V is not capable of providing its functional thermal insulation which is required for normal operation of the cryogenic pressure vessel without release of fuel through the safety valve(s) in the design temperature window and design pressure range. The thermal insulation of damaged thermal insulation V is greatly damaged or greatly degraded to the extent that the BMS is no longer capable of sufficiently converting fuel during normal operation. In order to avoid a rise in pressure, which is imminent due to penetrating heat, above the maximum operating pressure, fuel has to be released by the safety valve(s).

For example, damaged thermal insulation V is present if the degraded thermal insulation property is less than approx. 50%, furthermore preferably less than approx. 75% and particularly preferably less than 90% of the thermal insulation property of the intact thermal insulation.

At least one controller can be connected to the at least one sensor. Furthermore, at least one controller can be designed to determine the state of the thermal insulation V from the signal of the at least one sensor or of the monitoring device(s). The term controller here is used in its conventional sense and comprises means for controlling and/or regulating the components disclosed here, wherein for simplification only the term controller is used here.

The motor vehicle can include a refueling valve which is designed to interrupt the inflow of fluid into the inner vessel during the refueling, for example if the lower fluid density limit value $D_{UB}$ for the fluid in the inner vessel is exceeded. Alternatively or additionally, the motor vehicle can include a communication interface which is suitable for transmitting a refueling termination signal and/or a refueling limiting signal to the refueling device. For example, the motor vehicle can directly and/or indirectly measure the fluid density in the inner vessel. With a constant volume of the inner tank, the fluid density can be determined by a combined measurement of pressure and temperature in the inner tank. If it is established that the lower fluid density limit value $D_{UB}$ for the fluid in the inner vessel is exceeded, a controller triggers an action of the refueling valve, as a result of which the valve closes and the inflow of fluid into the inner vessel is interrupted or limited. Alternatively or additionally, a controller can send an interruption signal to the refueling device which then, for its part, closes a valve.

The technology disclosed here also includes a method for refueling a cryogenic pressure vessel of a motor vehicle. The method comprises the following steps:
  determining damage to thermal insulation V which is arranged at least in regions between an inner vessel and an outer vessel of the cryogenic pressure vessel; and
  interrupting the refueling of the motor vehicle if, in the event of damaged thermal insulation V, a lower fluid density limit value $D_{UB}$ for the fluid in the inner vessel is exceeded, wherein the lower fluid density limit value $D_{UB}$ is lower than an upper fluid density limit value $D_{OB}$ for the fluid in the inner vessel in the case of refueling of the inner vessel with intact thermal insulation V.

The method can be distinguished in that the lower fluid density limit value $D_{UB}$ is selected in such a manner that the inner vessel, even in the uninsulated state, can store the fluid filled cryogenically in the vessel without the maximally permissible inner vessel pressure $P_{max}$ being exceeded. In other words, the fluid density limit value $D_{UB}$ is selected in such a manner that the inner vessel can store the cryogenically filled quantity of fluid over the entire temperature window without the maximally permissible inner vessel pressure $P_{max}$ being exceeded.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
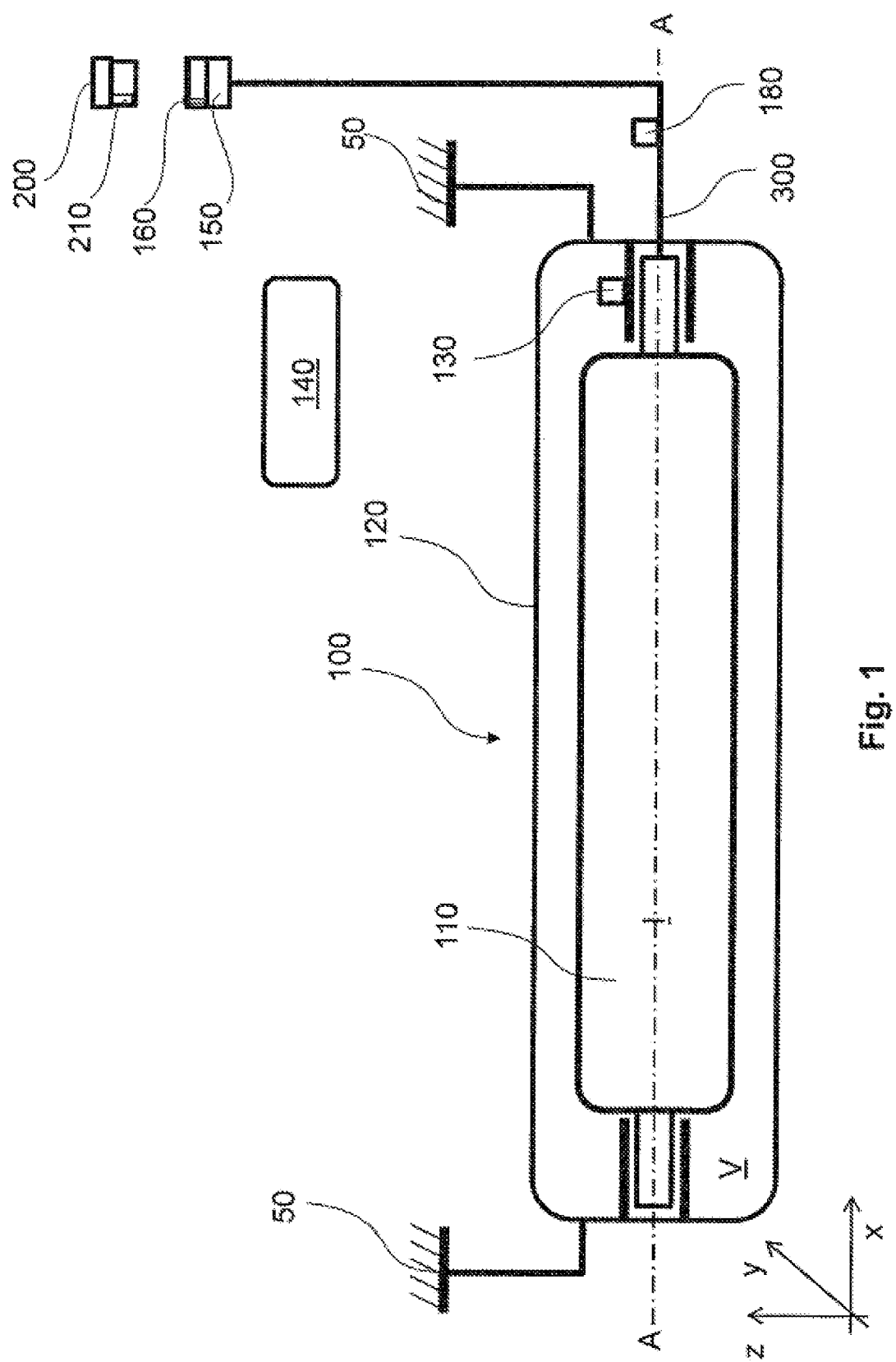
FIG. 1 is a schematic diagram of the basic construction of a cryogenic pressure vessel 100.

The cryogenic pressure vessel 100 illustrated in FIG. 1 is mounted at its two ends on the vehicle body 50. The outer vessel 120 delimits the cryogenic pressure vessel 100 in relation to the environment. Possible additional components of the cryogenic pressure vessel (for example heat exchangers) have been omitted in this simplified illustration. The inner vessel 110 is arranged in the outer vessel 120 at a distance from the outer vessel 120. The inner vessel 110 illustrated here comprises domes at its two ends. A substantially evacuated or super-insulated space V is located between the inner vessel 110 and the outer vessel 120. The inner vessel 110 is connected via a suspension system at its domes to the outer vessel 120. At one end of the inner vessel 110, a supply line 300 is connected to the inner vessel 110. The inner vessel 110 is refueled through the supply line 300. The sensor 130 can measure the pressure and/or the temperature of the evacuated space V.

A connection 150 is provided at the other end of the supply line 300. The connection or filler neck 150 is designed to be coupled to a corresponding connection 200 of a refueling device.

Furthermore, a communication interface 160 is arranged here in the connection 150. The communication interface is able to be connected to a corresponding communication interface 210 in the connection 200. A refueling termination signal and/or a refueling limiting signal can be transmitted to the refueling device 200 via the communication interface 160/210. In addition to this configuration, a radio-based communication (interface) is likewise contemplated (for example WiFi, WLAN, NFC, etc.) which does not have to be accommodated in the connection 200.

The refueling valve 180 is designed here to interrupt the fluid flow, here a hydrogen flow. The refueling valve 180 can be arranged anywhere in the supply line 300.

The controller 140 is designed to control the refueling and the operation of the cryogenic pressure vessel.

Figure 2:
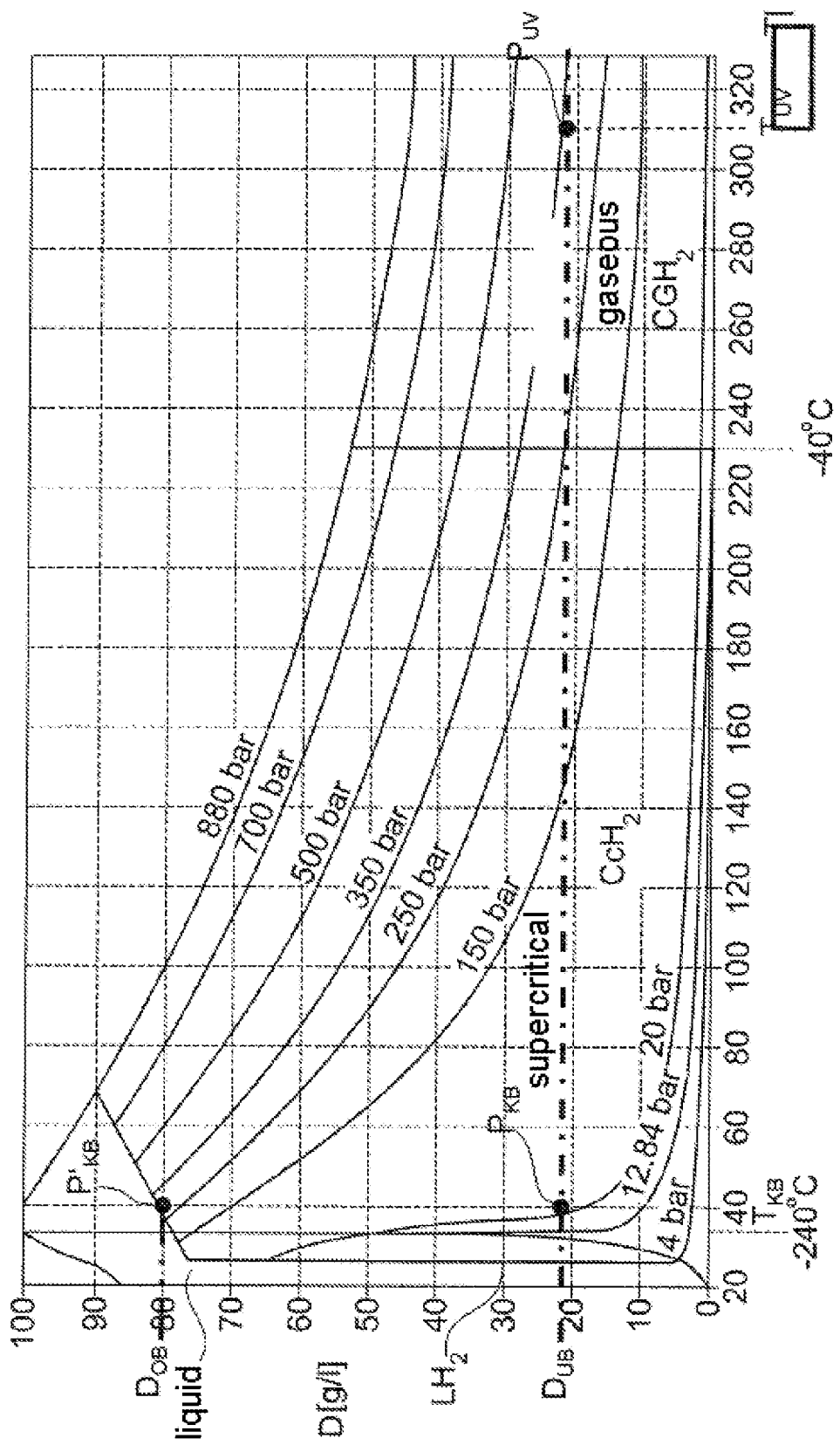
FIG. 2 is a graph of the fluid density D in the inner vessel 110 over the temperature for various inner vessel pressures.

FIG. 2 shows the fluid density D in the inner vessel 110 for various inner vessel pressures over the temperature. If a cryogenic pressure vessel 100 with intact thermal insulation V is cryogenically refueled, hydrogen is filled into the inner vessel 110 up to an upper fluid density limit value $D_{OB}$. For example, an inner vessel 110 which is designed for a maximum vessel inner pressure of approx. 250 to approx. 350 bar (also called maximally permissible inner vessel pressure Pmax or design pressure) can be refueled cryogenically at a temperature TKB of approx. 40 K up to an upper fluid density limit value $D_{OB}$ of approx. 80 gram/liter (point P'KB in FIG. 2). If the fluid in the inner vessel 110 with intact thermal insulation V is heated, comparatively small quantities of hydrogen should be converted via the BMS. The BMS is designed for these quantities of hydrogen. The hydrogen is therefore converted by the BMS without a hazardous mixture arising.

If the cryogenic pressure vessel 100 now has damaged thermal insulation V, the pressure vessel 100 has to comparatively rapidly dissipate comparatively large quantities of hydrogen so that the inner vessel 110 is not destroyed by the expanding hydrogen. In FIG. 2, such a great amount of hydrogen therefore then always has to be released starting from the point P'KB that the inner vessel 110 does not have a pressure above the design pressure of approx. 250 to 350 bar at any temperature T. In the heated state, for example at environmental temperature, the inner vessel 110 of the pressure vessel 100 can store, for example, a density of approx. 21 gram/liter in the inner vessel 110 (point PUV in FIG. 2 for a tank with a design pressure of approx. 350 bar). Consequently, the quantity of hydrogen which arises from the product of approx. 60 gram/liter and the inner vessel volume should therefore be released. Under some circumstances, this quantity of hydrogen may not be converted by the BMS in the comparatively short time, and therefore hydrogen has to be released directly into the environment via the safety valve or the bursting disk. A mixture with a hazardous potential may then arise under some circumstances in the environment of the motor vehicle.

If damage to the thermal insulation V is then determined, refueling should be ceased up to the upper fluid density limit value DOB. However, it is not necessary to completely dispense with refueling. On the contrary, it is possible to cryogenically refuel the inner vessel 110 in such a manner that a critical inner vessel pressure does not arise even in the heated state of the cryogenically filled fluid. For this purpose, at the cryogenic refueling temperature, the fluid density D should be limited to a lower fluid density limit value $D_{UB}$ for the fluid in the inner vessel 110, wherein the lower fluid density limit value $D_{UB}$ is selected in such a manner that the inner vessel 110 in the uninsulated state can store the fluid without the maximally permissible inner vessel pressure Pmax being exceeded. For an inner vessel 110 with a maximally permissible inner vessel pressure Pmax of approx. 350 bar, a lower fluid density limit value DUB of approx. 21 gram/liter (point PKB in FIG. 2) arises for hydrogen as the fuel. If refueling is permitted for hot use, the vehicle can continue to be used without danger—albeit with a reduced range—without hydrogen being inefficiently consumed in the process. If fiber-reinforced inner vessels are used, for example with braided and/or wound fiber layers around the inner vessel, ranges of more than 200 km can be achieved. Considerable distances can therefore be covered even with damaged thermal insulation. The vehicle driver himself can still bring the vehicle to the service garage and the vehicle does not break down out on the road.

The preceding description of the present invention serves only for illustrative purposes and not for the purpose of limiting the invention. Within the scope of the invention, various amendments and modifications are possible without departing from the scope of the invention and the equivalents thereof. Even though the description is primarily focused on hydrogen as fuel, other fuels, such as compressed natural gas, are likewise included therewith. The numerical values mentioned are merely preferred values. It is likewise possible, for example, to provide inner vessels 110 with higher or low design pressures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for refueling a cryogenic pressure vessel of a motor vehicle, the method comprising the steps of:
   determining that the thermal insulation, which is arranged at least in regions between an inner vessel and an outer vessel of the cryogenic pressure vessel, is damaged;
   beginning a refueling of the inner vessel of the cryogenic pressure vessel;
   determining that, via the refueling, a lower fluid density limit value for the fluid in the inner vessel is reached or exceed; and
   interrupting, via a refueling valve, the refueling in response to the determination that the thermal insulation is damaged, and in response to the determination that the lower fluid density limit value for the fluid in the inner vessel is reached or exceeded,
   wherein the lower fluid density limit value is lower than an upper fluid density limit value for the fluid in the inner vessel in the case of refueling of the inner vessel with intact thermal insulation.

2. The method as claimed in claim 1, wherein the lower fluid density limit value is such that the inner vessel in an uninsulated state can store a fluid without the maximally permissible inner vessel pressure being exceeded.

3. The method as claimed in claim 1, wherein the refueling is interrupted in response to the determination that the lower fluid density limit value is reached.

4. The method as claimed in claim 2, wherein the refueling is interrupted in response to the determination that the lower fluid density limit value is reached.

5. The method as claimed in claim 1, further comprising the step of:
   transmitting, via a communication interface, a refueling termination signal and/or a refueling limiting signal to a refueling device so as to interrupt the refueling.

6. The method as claimed in claim 2, further comprising the step of:
   transmitting, via a communication interface, a refueling termination signal and/or a refueling limiting signal to a refueling device so as to interrupt the refueling.

7. The method as claimed in claim 3, further comprising the step of:
   transmitting, via a communication interface, a refueling termination signal and/or a refueling limiting signal to a refueling device so as to interrupt the refueling.

* * * * *